United States Patent [19]

Perlman

[11] 3,778,724

[45] Dec. 11, 1973

[54] VOLTAGE CONTROLLED DIGITAL PULSE TRAIN GENERATOR

[75] Inventor: David Perlman, Irvine, Calif.

[73] Assignee: North American Rockwell Corporation, El Segundo, Calif.

[22] Filed: May 1, 1972

[21] Appl. No.: 249,012

[52] U.S. Cl. .................................. 328/150, 328/39
[51] Int. Cl. .......................................... H03k 17/00
[58] Field of Search ...................... 328/127, 150, 46, 328/61, 48; 331/74

[56] References Cited

UNITED STATES PATENTS

| | | | |
|---|---|---|---|
| 3,566,283 | 2/1971 | Diebler | 328/150 |
| 3,621,403 | 11/1971 | Seiy | 328/46 |
| 3,617,711 | 11/1971 | Smyth | 328/48 |

*Primary Examiner*—John W. Huckert
*Assistant Examiner*—R. E. Hart
*Attorney*—L. Lee Humphries et al.

[57] ABSTRACT

A precision voltage controlled digital pulse train generator wherein a summing integrator is used to keep the average count of a digital divider at a value such that the average frequency deviation from a nominal frequency $f_0$ corresponding to a count of $N$ is proportional to a control voltage input.

7 Claims, 7 Drawing Figures

VOLTAGE CONTROLLED DIGITAL PULSE TRAIN GENERATOR

BACKGROUND OF THE INVENTION

1. Field of the Invention

The invention relates to apparatus for providing an improved voltage controlled digital pulse train generator wherein a summing integrator is used to keep the average count of a digital divider at a value such that the average frequency deviation from a nominal frequency $f_0$ corresponding to a count of $N$ is proportional to an analog control voltage.

More particularly, the invention relates to a voltage controlled digital pulse train generator, with controllable precision frequency variations from a fraction of a Hz (Hertz) to several Hz. The new frequency is obtained by selectively choosing one of two integers by which a digital frequency divider divides a preselected frequency in such a manner that the average frequency output of the divider is a function of an input control voltage. The invention of the applicant has application in a phase-locked loop wherein the purpose of the loop is to track a received carrier signal (or reference tone) frequency in the presence of noise, phase jitter and frequency translation. For such an application the phase-locked loop characteristics are designed to obtain the best compromise between "phase jitter" tracking capability and noise immunity while keeping the bandwidth narrow enough to minimize interference from the data signal.

In U.S. Pat. No. 3,638,122, issued Jan. 25, 1972, entitled "High Speed Digital Transmission System," by Earl D. Gibson, which patent, as well as the present application is assigned to North American Rockwell Corporation, now known as Rockwell International Corporation, a system is described for correctly receiving digital data in the presence of intersymbol interference, noise, and other transmission channel disturbances. The system includes a receiver with a carrier recovery circuit using a phase-locked loop wherein applicant's invention finds particular utility. The phase-locked loop tracks the received carrier accurately to reproduce the same undesirable phase jitter and frequency translation as has been introduced on the main data signal by the transmission channel. Thus, when the recovered carrier is used to drive a demodulator, the undesirable phase jitter and frequency translation are removed from the data signal. More specifically, in relation to FIG. 8 of the aforesaid patent, there is described a phase-locked loop comprising a balanced modulator 65 in series with a filter 66 and a voltage controlled oscillator 67. The output of the voltage controlled oscillator 67 is fed back to the modulator 65 and outputted to other circuits in the receiver. Applicant's device can be utilized in place of the voltage controlled oscillator 67.

The phase-locked loop of the aforesaid patent, with applicant's pulse train generator incorporated therein, would operate in the following manner. The carrier signal from the transmission channel is initially passed through a line termination device and a bandpass filter and then provided as an input to the balanced modulator 65 in the phase-lock loop. The carrier signal is then modulated by the fed back output of applicant's pulse generator to provide sum and difference frequencies. The resultant signal is then filtered by the filter to provide only the difference frequency to the pulse generator. The feedback loop thus operates to drive the output of the pulse generator to the same frequency as that of the carrier signal input to the modulator.

In U.S. Pat. No. 3,669,511, issued June 13, 1972, entitled "A System for Phase Locking on a Virtual Carrier Received by an Asymmetrical Receiver," by David M. Motley, et al., also assigned to North American Rockwell Corporation, there is described a phase-locked loop used to track the phase of the transmitted carrier of a received signal wherein applicant's invention can also be utilized.

2. Description of Prior Art

Prior art devices for performing similar functions have usually consisted of digital dividers with the dividing modulus being controlled by the output of an analog to digital converter. The difficulty exhibited with this type of configuration is that such devices are only stepwise linear in voltage/frequency characteristics. Further, the smaller the step, the more complex and expensive is the configuration. It is to be appreciated that in the typical system the step size is frequently of the order of a fraction of a Hz with a carrier of approximately 3 KHz.

SUMMARY OF THE INVENTION

Briefly, the invention of the applicant comprises a precision voltage controlled digital pulse train generator wherein a summing integrator is used to keep the average count of a digital divider at a value such that the average frequency deviation from a frequency $f_0$ corresponding to a count of $N$ is proportional to an analog control voltage. The summing integrator utilizes an input analog control voltage and an input voltage level of either $+V$ or $-V$ from a standard voltage level converter to generate a varying output voltage. This varying output voltage is transformed by a comparator into either a logic 0 or a logic 1 state signal as a function of the polarity of the varying output voltage with respect to a preselected reference voltage. The logic state signal from the comparator is controllably applied via a control flip-flop to the digital divider to determine the divisor thereof. At the same time, the logic state signal from the comparator is applied via a logical inverter and the control flip-flop to the standard voltage level converter to thereby determine whether the $+V$ or the $-V$ is applied to the summing integrator. The control flip-flop which switches the voltage to the +V or to the −V level, simultaneously controls the mode of operation of the digital divider to cause the divider to divide either by $N_1$ or $N_2$, where $N_1$ and $N_2$ are arbitrary integers corresponding to desired frequency outputs of the device. This results in the average counter frequency deviation from a nominal frequency $f_0$ being proportional to the analog control voltage.

It is therefore an object of this invention to provide a new and novel apparatus for providing voltage control of a digital divider.

It is another object of the present invention to provide an improved voltage controlled digital pulse train generator with precision frequency deviations of a fraction of a Hz to several Hz.

It is another object of the present invention to provide a voltage controlled digital pulse train generator wherein a summing integrator is used to keep the average count of a digital divider at a value such that the average frequency deviation from a frequency $f_0$ corresponding to a count of $N$ is proportional to an analog control voltage.

It is still another object of the present invention to provide at a relatively low cost a voltage controlled digital pulse train generator which has the advantage of high stability and a nearly perfect linear relationship between voltage input and frequency output.

BRIEF DESCRIPTION OF THE DRAWINGS

These and additional objects of the present invention will become more apparent when taken in conjunction with the following description and drawings in which like characters indicate like parts, and wherein.

DESCRIPTION OF THE PREFERRED EMBODIMENT

Figure 1:
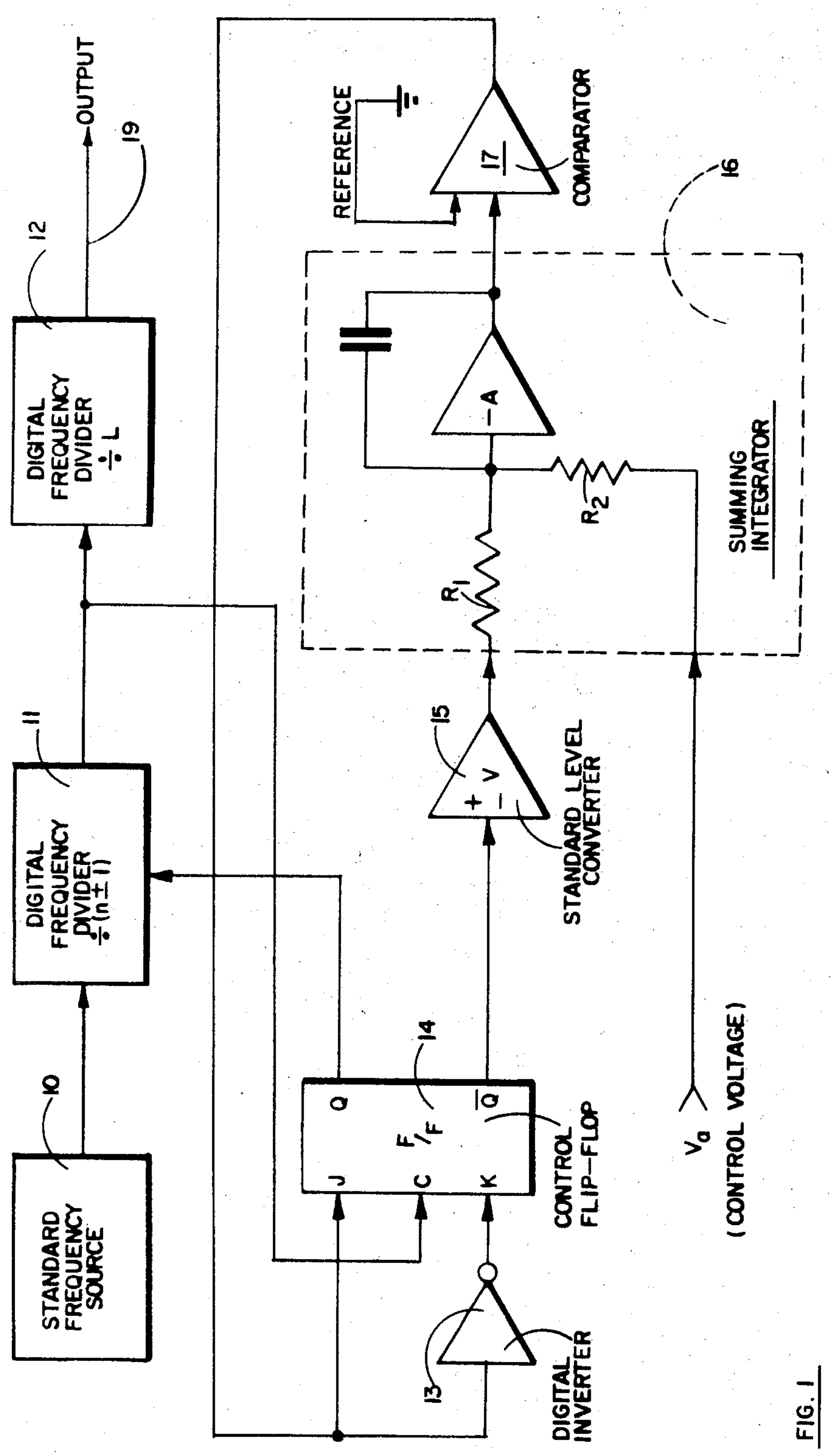
FIG. 1 is a block diagram of the voltage controlled digital pulse train generator, of this invention.

Referring now to the drawings, FIG. 1 illustrates a preferred embodiment of the invention. A digital frequency divider 11 receives a preselected fixed frequency input signal from a standard frequency source 10 and a digital input from a control flip-flop 14. The digital output of digital frequency divider 11 is provided to a digital frequency divider 12 and to the clock input C of a control flip-flop 14. The digital frequency divider 12 provides an output 19. In addition to the digital input to digital frequency divider 11, control flip-flop 14 provides a digital input to standard level converter 15 which provides a precision voltage level input to summing integrator 16. A second input is received by summing integrator 16 which is the analog control voltage $V_a$ for the voltage controlled divider. Summing integrator 16 provides a varying voltage level input to comparator 17 which in turn provides a digital input to input J of control flip-flop 14 and to digital inverter 13. The digital output of digital inverter 13 is fed to input $K$ of control flip-flop 14.

Digital frequency divider 11 is a variable divider which either divides by arbitrary integers $N_1$ or $N_2$ depending on the digital state of output Q of control flip-flop 14. The digital state of control flip-flop 14 is determined by comparator 17 which decides whether the voltage output of summing integrator 16 is positive or negative. Control flip-flop 14 is clocked by the output of digital frequency divider 11.

For purposes of explanation $N_1$ will be selected as $N + 1$ and $N_2$ as $N - 1$, where $N$ is an arbitrary integer corresponding to the desired nominal frequency $f_0$ of the divider 11.

In operation, control flip-flop 14 provides either a logic 0 or logic 1 level to standard level converter 15 wherein the logic level is changed to a precision voltage level which is provided as an input to summing integrator 16. The output of summing integrator 16 is the negative of the integral of $V + V_a$, where $V$ is the output of standard level converter 15 and $V_a$ is the input control voltage. The output of comparator 17 is a logic 0 for positive inputs from summing integrator 16 and a logic 1 for negative inputs therefrom. Typical signal relationships are shown in FIGS. 2*a*, 2*b*, 2*c*, 2*d*, 2*e* and 2*f*.

Figures 2A, 2B, 2C, 2D, 2E, 2F:
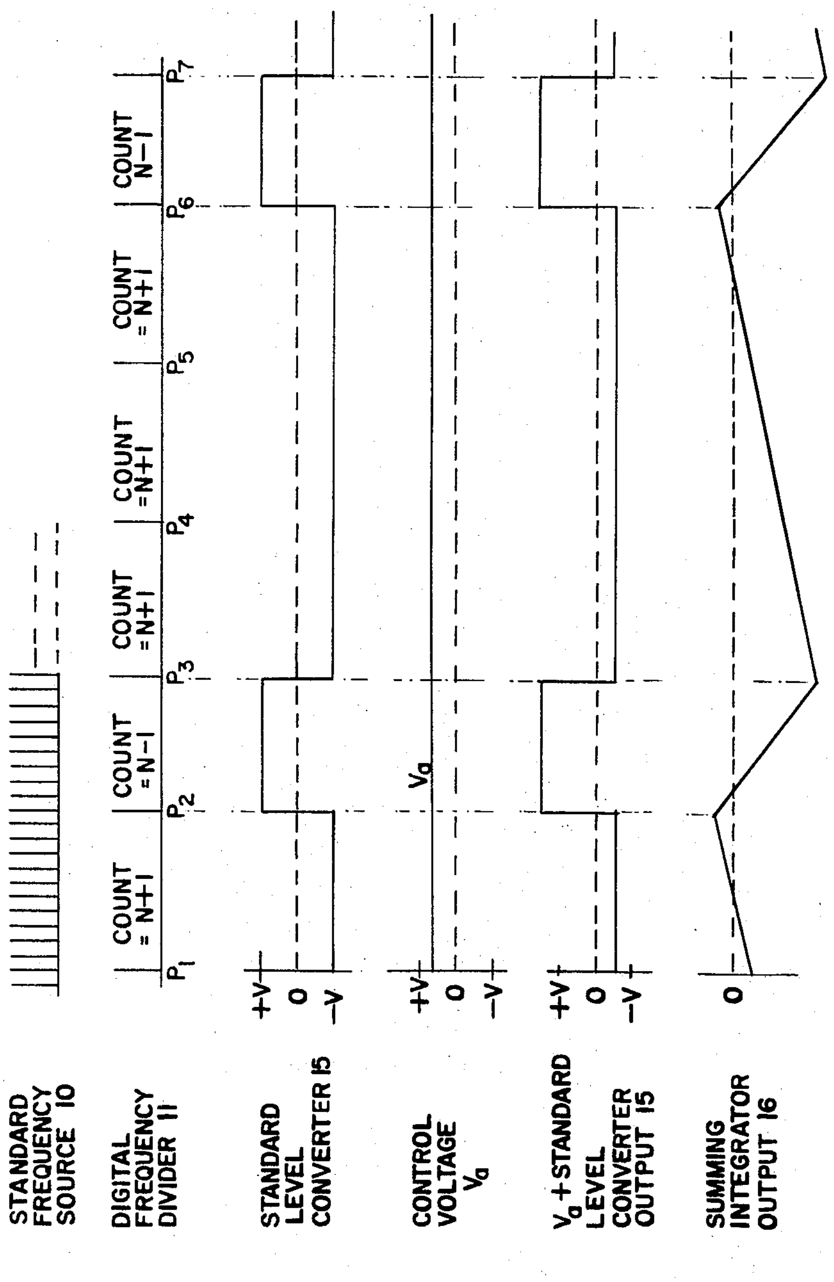
FIGS. 2*a*, 2*b*, 2*c*, 2*d*, 2*e* and 2*f* are waveforms useful in explaining the operation of the voltage controlled digital pulse train generator of FIG. 1.

Assuming that initially the output of summing integrator 16 is negative, as shown in FIG. 2*f*, the output of comparator 17 will be a logic 1 which will be provided both at input J of control flip-flop 14 and to digital inverter 13. Digital inverter 13 will apply a logic 0 to input $K$ of control flip-flop 14. In response to an output pulse $P_1$ (FIG. 2*b*) the divider 11, which is fed back as a command signal, flip-flop 14 is clocked to transfer the logic 1 state present at input J of digital flip-flop 14 to output $Q$ thereof and thus to digital frequency divider 11. The output of digital frequency divider 11 is one pulse for each $N + 1$ pulses from standard frequency source 10 when the input transferred from flip-flop 14 is a logic 1, or one pulse for each $N - 1$ pulses from standard frequency source 10 if the input from flip-flop 14 is a logic 0.

Therefore, for a logic 1 state input from control flip-flop 14, digital divider 11 will begin dividing by $N + 1$ and providing an output pulse for each $N + 1$ pulses from frequency source 10. FIG. 2*a* shows the pulses from frequency source 10 and FIG. 2*b* shows the output pulse $P_2$ after $N + 1$ pulses. For purposes of illustration, $N$ is the integer 10.

Simultaneously with the transfer of the logic 1 state to divider 11, the logic 0 state provided at input $K$ of control flip-flop 14 will be transferred to the output $\overline{Q}$ of control flip-flop 14 and thus to the input to standard level converter 15. Converter 15 will respond by providing, as shown in FIG. 2*c*, a $-V$ input to summing integrator 16 during the period between pulses $P_1$ and $P_2$. If a logic 1 state is provided as the input to standard level converter 15, it will respond with a $+V$ input to summing integrator 16. This is shown by FIG. 2*c* for the period between $P_2$ and $P_3$.

FIG. 2*d* shows control voltage $V_a$ as a constant for purposes of explanation. In actual operation $V_a$ is not a constant of course, but is constrained to be less than $+V$ and greater than $-V$. FIG. 2*e* shows the sum of $V_a$ and the output of standard level converter 15.

With control voltage $V_a$ constrained to be less than $+V$ and greater than $-V$, the output of summing integrator 16 will begin to change in the positive direction due to the $-V$ input from level converter 15, as shown in FIG. 2*f*. When the output of integrator 16 (FIG. 2*f*) reaches a value greater than 0, the output of comparator 17 will change from logic 1 to logic 0. This logic 0 state will be provided to input $J$ of flip-flop 14. In response to the next output pulse, $P_2$, from the digital divider 11 to its clock input C, the flip-flop 14 will transfer the logic 0 state present at its $J$ input to its Q output and hence to the input of the digital divider 11. Digital divider 11 will then begin dividing by $N - 1$. This is shown by the more narrow spacing between $P_2$ and $P_3$ in FIG. 2*b* (nine pulses) as compared to the spacing between $P_1$ and $P_2$ (11 pulses).

Similarly, the logic 0 state of comparator 17 will be provided as an input to digital inverter 13 which will then provide a logic 1 state to the input $K$ of the control flip-flop 14. At the time of the pulse $P_2$ this logic 1 state will be transferred to the $\overline{Q}$ output of flip-flop 14 and therefore provided to standard level converter 15. This results in an input of $+V$ being provided to summing integrator 16 by standard level converter 15 between the $P_2$ and $P_3$ output pulses from divider 11 as shown in FIG. 2*c*. Consequently, the output of integrator 16 will begin to change in the negative direction as shown in FIG. 2*f* and will continue to do this until the output again becomes negative.

As illustrated in FIG. 2*e*, for $V_a$ positive, $V_a + V$ has a greater absolute magnitude than $V_a - V$. The integrator 16 output therefore has a greater negative slope for $V_a + V$ than it has a positive slope for $V_a - V$. Consequently, the output of integrator 16 will be negative most of the time, causing the comparator 17 to output a logic 1 most of the time. Further, as illustrated in FIG. 2*c*, the level converter 15 will therefore have a negative ($-V$) output more of the time than it has a positive ($+V$) output.

This also provides that the Q output of flip-flop 14 will remain at logic 1 more of the time than at logic 0. Divider 11, in this case, therefore will divide by $N + 1$ more of the time than by $N - 1$. The average output frequency will therefore be closer to that corresponding to a count of $N + 1$ than $N - 1$. For negative $V_a$ the reverse is true.

Continual operation in this manner will cause the output of summing integrator 16 to be maintained near zero by the negative feedback of the loop consisting of comparator 17, flip-flop 14, and standard level converter 15. Since the output of integrator 16 is held near zero, the average value of the output of standard level converter 15 is therefore approximately equal to the negative of the control voltage $V_a$. The deviation from zero of the integrator 16 output will depend upon the period of the output of frequency divider 11.

In the above operation the frequency divider 12 is not an integral part of applicant's invention, but rather it is utilized for versatility of the output 19. Also, it is to be understood that the output 19 from frequency divider 12 could be used to clock flip-flop 14. In addition, the output 19 could be taken from within frequency divider 11 if a higher output frequency is desired.

Note also that in the discussion herein the two counts $N_1$ and $N_2$ of the divider 11 where selected as $N + 1$ and $N - 1$, respectively. These counts could be $N + I$ and $N - J$ where $I$ and $J$ are arbitrary integers, where both are not zero, are small with respect to $N$, and are convenient to the particular application. The result of increasing $I$ and $J$ for a given value of $N$ is to produce a proportionately larger frequency deviation from the nominal frequency $f_o$ for the same analog control voltage input. However, for purposes of explanation and clarity, $I$ and $J$ have been set to 1.

The following analysis shows that the maximum phase error of frequency divider 11 corresponds to one period of the frequency source 10.

If the control voltage $V_a$ as a function of time is $v_a(t)$ and the output of standard level converter 15 is $v_e(t)$, negative feedback holds the integral:

$$\int_{-\infty}^{t_1} [v_a(t) - v_e(t)]\, dt = 0 \qquad (1)$$

where $t_1$ is any arbitrary time.
Also, $$\int_{-\infty}^{t_2} [v_a(t) - v_e(t)]\, dt = 0 \qquad (2)$$

Let $(t_2 - t_1) > 0$
Subracting Eq. 1 from Eq. 2

$$\int_{-\infty}^{t_2} [V_a(t) - V_e(t)]\, dt - \int_{-\infty}^{t_1} [V_a(t) - V_e(t)]\, dt = 0 \qquad (3)$$

$$\int_{t_1}^{t_2} [v_a(t) - v_e(t)] = 0 \qquad (4)$$

Equation 4 is equal to zero assuming that no constraints are applied to the variation rate of $v_e(t)$. However, in the present application $v_e(t)$ is constrained to be constant over a period $t_2 - t_1$ equal to $N \pm 1$ counts of the frequency source 10.

Assuming for convenience the output of standard level converter 15 is ±1 volt, the maximum error in the output of summing integrator 16, considering standard level converter 15, summing integrator 16, and comparator 17 as being perfect, is the integral of 1 volt over the period of the $N \pm 1$ digital frequency divider 11. The maximum phase error at the output of frequency divider 11 thus corresponds to a single period of the output of standard frequency source 10.

The proportionality of the output frequency of divider 11 to control voltage $V_a$ is now considered. A single divider period for frequency divider 11 is defined as $K(n + 1)$ seconds for the long count, or $K(n - 1)$ seconds for the short count. The nominal period, Kn seconds, will correspond to the frequency $f_o$ (Hz) HZ. The frequency averaged over $m$ periods in which there are $p$ periods of length $K(n + 1)$ and $m - p$ periods of length $K(n - 1)$ is $f_{av}$.

$f_{av} = m/T_m$ where $T_m$ is the time for the $m$ periods.

$$f_{av} = m/[pK(n+1) + (m-p)K(n-l)] = (1/K)\, m/[m(n-1) + 2p] \qquad \text{Eq. 5}$$

The frequency offset, $\Delta f_{av}$ is $f_{av} - f_o$ $$\Delta f_{av} = (1/K)[m/m(n-1) + 2p] - 1/Kn$$
$$= (1/Kn)\, \{mn - [m(n-l) + 2p]/[m(n-1) + 2p]\}$$
$$= (1/Kn)\, [m - 2p]/[m(n-1) + 2p] \qquad \text{Eq. 6}$$

The short count level from converter 15 corresponds to + 1 volts and the long count level corresponds to −1 volts. The average of the ± 1 volt digital signals must equal the analog control voltage $V_a$. There are p periods of length $K(n + 1)$ seconds at −1 volt and $m - p$ periods of length $K(n - 1)$ seconds at +1 volt. Averaging over $T_m$ seconds:

$$V_a = [-p\,K(n+1) + (m-p)K(n-1)]/T_m$$
$$= [n(m-2p) - m]/[m(n-l) + 2p]$$
$$= [n(m-2p)]/[m(n-1) + 2p] - m/[m(n-1) + 2p]$$
$$= Kn^2 (1/Kn)(m-2p)/[m(n-1) + 2p] - K(1/K)\, m/[m(n-1) + 2p] \qquad \text{Eq. 7}$$

Substituting from Eq. 5 and Eq. 6

$$V_a = Kn^2 \Delta f_{av} - K f_{av} \qquad \text{Eq. 8}$$

Adding $K f_o$ to both sides, $$V_a + K f_o = Kn^2 \Delta f_{av} - K f_{av} + K f_o$$
$$V_a + K f_o = Kn^2 \Delta f_{av} - K \Delta f_{av}$$
$$= K \Delta f_{av} (n^2 - 1) \qquad \text{Eq. 9}$$

$$\Delta f_{av} = [f_o/(n^2 - 1)](nV_a + 1) \qquad \text{Eq. 10}$$

$\Delta f_{av}$ is therefore a linear function of the control voltage $V_a$. When the control voltage is at its extreme values ±1

$$\Delta f_{-1} = -f_o/(n+1) \qquad \text{Eq. 11}$$

$$\Delta f_{+1} = f_o/(n-1) \qquad \text{Eq. 12}$$

Normalizing $\Delta f_{av}$, $$\Delta f_{av}/f_o = \Delta_{av} = [n/(n^2 - 1)](V_a + 1/n) \quad \text{Eq. 13}$$

= average deviation.

For large $n$, $$\Delta_{av} \sim (1/n)(V_a + 1/n) \quad \text{Eq. 14}$$

and since $$\Delta{+}1 \approx -\Delta{-}1 \approx 1/n = \Delta_{max} \quad \text{Eq. 15}$$

$$\Delta_{av} \sim \Delta_{max}(V_a + \Delta_{max}) \quad \text{Eq. 16}$$

The percent voltage offset at $\Delta_{av} = 0$ is therefore equal to the maximum frequency deviation in percent.

There has been shown a precision voltage controlled digital pulse train generator with precision frequency deviations of a fraction of a Hz to several Hz, wherein the average frequency deviation of the output from a frequency $f_o$, corresponding to a count of $N$, is proportional to an analog input control voltage.

Although the invention has been described and illustrated in detail, it is to be understood that the same is by way of illustration and example only, and is not to be taken by way of limitation; the spirit and scope of the invention being limited only by the terms of the appended claims.

I claim:

1. An apparatus for providing as a function of an input control signal a precise frequency deviation from a preselected frequency, said apparatus comprising:
 - a signal source for supplying a first signal at a first frequency;
 - a frequency divider coupled to said signal source for selectively dividing the first frequency by one of first and second integers to generate an output signal at a desired frequency; and
 - control means coupled to said frequency divider, being responsive to said input control signal for applying a second signal having first and second states to said frequency divider to cause said frequency divider to divide the first frequency by the first integer when the second signal is in its first state and by the second integer when the second signal is in its second state so that the average frequency deviation from the preselected frequency is proportional to the control signal.

2. The apparatus of claim 1 wherein said first and second integers correspond to desired frequency limits of said frequency divider.

3. The invention of claim 1 wherein said control means comprises:
 - first means for providing a third signal at a preselected voltage level and with a polarity dependent upon the logic state of the second signal;
 - second means, coupled to said first means, being responsive to the third signal and to the input control signal for developing a fourth signal having a voltage level which varies as the integral of the sum of the input control and third signals;
 - third means, coupled to said second means and being adapted to receive a reference voltage, for providing a digital output signal, the logic state of which changes as the fourth signal becomes positive or negative with respect to the reference voltage; and
 - fourth means coupled between said third means and said frequency divider for simultaneously transferring in response to each output signal from said frequency divider the digital state of said third means to said frequency divider as a control signal to select an associated one of the first and second integers and the inverse of said digital state of said third means to said first means to reverse the polarity of said third signal.

4. An apparatus controlled by an analog input voltage for providing precision frequency variations from a preselected frequency, with the frequency variations ranging from a fraction of a Hz several Hz, said apparatus comprising:
 - converter means responsive to a digital input signal for providing a first signal at a preselected voltage level and with a polarity dependent upon the logic state of said digital input signal;
 - summing integrator means coupled to said converter means for summing and integrating the first signal and the analog input voltage to provide a varying voltage level output;
 - voltage comparator means, coupled to said summing integrator means and being adapted to receive a reference voltage, for providing a digital output signal, the logic state of which changes as the varying voltage level output of said summing integrator means becomes positive or negative with respect to the reference voltage;
 - control means coupled to said comparator means and to said converter means for selectively applying the complement of the digital output signal from said voltage comparator means to said converter means to reverse the polarity of the first signal;
 - frequency source means for providing a first digital signal at a first frequency; and
 - digital frequency divider means coupled to said frequency source means and to said control means for selectively dividing the first frequency by one of first and second integers to generate a pulse train of pulses wherein each pulse of the pulse train enables said control means to simultaneously cause the logic state of said digital input signal to change and said digital frequency divider means to divide the first frequency by the other one of the first and second integers.

5. A precision voltage controlled digital pulse generator for providing digital pulses having an average frequency deviation from a preselected frequency $f_o$ proportional to an analog input control voltage, said digital pulse generator comprising:
 - converter means responsive to a digital input signal for providing a first signal at a preselected voltage level and with a polarity dependent upon the logic state of said digital input signal;
 - voltage processing means coupled to said converter means for combining said preselected voltage level and said input control voltage to develop a first digital pulse, the logic state of which is determined by the polarity of the integral of the sum of said preselected voltage level and said input control voltage;
 - digital frequency source means for providing a first digital signal at a first frequency;
 - digital frequency divider means coupled to said digital frequency source means for selectively dividing the first frequency by one of preselected integers to provide a digital pulse train output; and
 - control means, coupled to said voltage processing means and to said digital frequency divider means, being responsive to each pulse of said digital pulse train output for transferring the logic state of the first digital pulse to said digital frequency divider means to select an associated one of said preselected integers and for simultaneously changing the logic state of said digital input signal.

6. A precision voltage controlled digital pulse generator comprising:

first means for receiving an analog input control voltage;

second means for providing a preselected voltage level with a selectable polarity;

third means for combining said preselected voltage level and said input control voltage to develop a first digital pulse the state of which is determined by the polarity of the integral of the sum of said preselected voltage level and said input control voltage;

digital frequency source means for providing a first signal at a first frequency;

digital frequency divider means coupled to said digital frequency source means for selectively dividing the first frequency by one of preselected integers to provide a digital output pulse upon completion of each division; and control means, coupled to said second means, third means and digital frequency divider means, being responsive to each digital output pulse for applying the first digital pulse to said digital frequency divider means to enable said digital frequency divider means to selectively divide the first frequency by a selected one of said preselected integers as a function of the state of said first digital pulse and simultaneously causing the polarity of said preselected voltage level to change.

7. A digital pulse generator comprising:

a signal source for supplying first digital pulses at a first frequency;

a digital frequency divider coupled to said signal source for selectively dividing the first frequency of the first digital pulses by one of first and second integers to provide a digital pulse train output at a desired frequency;

first means responsive to a first signal having one of first and second states and to a control signal for developing a second signal having a state which is controlled as a function of the state of the first signal; and second means, coupled between said digital frequency divider and said first means, being responsive to each pulse of the digital pulse train output for developing the first signal and a third signal having complementary states which are respectively controlled as a function of the state of the second signal, the third signal being applied to said digital frequency divider to cause said divider to selectively divide the first frequency by the first and second integers so that the average frequency deviation from a preselected frequency is substantially determined by the control signal to enable the digital frequency divider to provide the digital pulse train output at the desired frequency.

* * * * *